(12) United States Patent
Reff

(10) Patent No.: US 6,798,985 B2
(45) Date of Patent: Sep. 28, 2004

(54) CAMERA SYSTEM INCLUDING A CAMERA MOUNTING APPARATUS FOR OBTAINING CLOSE-UP PHOTOGRAPHS

(76) Inventor: Albert A. Reff, 510 N. Prospect Ave. Suite 105, Redondo Beach, CA (US) 90277

( * ) Notice: Subject to any disclaimer, the term of this patent is extended or adjusted under 35 U.S.C. 154(b) by 0 days.

(21) Appl. No.: 10/135,146

(22) Filed: Apr. 30, 2002

(65) Prior Publication Data

US 2003/0202790 A1 Oct. 30, 2003

(51) Int. Cl.[7] .............................................. G03B 17/00
(52) U.S. Cl. .............................. 396/14; 396/71; 396/89; 396/544
(58) Field of Search ............................ 396/71, 89, 544, 396/14, 419

(56) References Cited

U.S. PATENT DOCUMENTS 3,687,030 A * 8/1972 Dine et al. ................. 396/544
3,836,927 A * 9/1974 Dine et al. ................. 396/544
5,576,781 A * 11/1996 Deleeuw ......................... 396/6
5,950,017 A * 9/1999 Reff .............................. 396/14

* cited by examiner

*Primary Examiner*—David M. Gray
(74) *Attorney, Agent, or Firm*—Christie, Parker & Hale, LLP

(57) ABSTRACT

A sterile, disposable camera system which is always sterilized for use and avoids the need to sterilize the camera or camera mounting system for re-usage includes a sterile camera unit which is easily, removably mounted on a sterile mounting apparatus which is constructed to be collapsible. The camera mounting system is disposable such that after the camera system has been used, the sterile camera unit is easily removed from the sterile mounting apparatus and the mounting apparatus can be discarded as waste. The mounting apparatus is arranged to support the sterile camera unit relative to a subject to be photographed such that the camera quickly obtains in-focus close-up photographs of subjects of interest. The system includes a mini-crowbar like tool for safe removal of the film cartridge after camera use.

32 Claims, 4 Drawing Sheets

CAMERA SYSTEM INCLUDING A CAMERA MOUNTING APPARATUS FOR OBTAINING CLOSE-UP PHOTOGRAPHS

BACKGROUND OF THE INVENTION

1. Field of the Invention

The present invention relates to a camera system for obtaining close-up still or video photographs of a subject, and more particularly, a sterile, disposable camera system including a sterile camera unit and a sterile mounting apparatus which is constructed to be collapsible and disposable such that after the camera system has been used, the sterile camera unit is easily removed from the mounting apparatus and the mounting apparatus can be collapsed and discarded as waste.

2. Description of the Related Art

Prior art systems have been devised for mounting photographic cameras relative to subjects to be photographed such that accurate, in-focus close-up photographs of the subjects can be obtained. One such camera mounting system is disclosed in two patents issued to Dine et al., U.S. Pat. Nos. 3,836,927 and 3,687,030.

In these two patents, Dine teaches a camera mounting system having a camera supporting structure which is formed of metal and includes a locator arm attached to a mounting bracket which supports a close-up lens. A camera is placed on the mounting bracket and attached thereto via a screw such that the camera is located at a position which aligns the camera lens and close-up lens. The locator arm includes a picture-bracketing frame for defining a plane at the point of focus of the camera and close-up lens combination. As a result of this structural arrangement, when the picture-bracketing frame is positioned over a subject to be photographed, the subject to be photographed fills the image field of the camera and is in-focus for the close-up lens.

Although the Dine camera is constructed to function as a close-up camera to provide proper focus for photographing an object at close range, it is not suited to meet the demands of present day health care industry described below.

Physicians frequently have a need for photographic records of clinical features of a patient's condition for documenting medical procedures, for aide in diagnosing and teaching, and for malpractice risk reduction procedures requiring accurate, contemporaneous documentation of medical conditions and procedures.

For example, a dermatologist may wish to photograph skin lesions on a patient. An orthopedic surgeon may wish to obtain photographs of a knee or elbow undergoing surgery at various points during the surgery. An oral surgeon may desire photographs of a patient's teeth or gums. In each of these instances, the ability to quickly access a photographic system and place a sterile camera at the proper focal distance to reproducibly obtain an in-focus close-up of the area undergoing treatment and then quickly and easily remove the camera and discard the camera mounting system without concern for labor intensive and reliability concerns of recycling equipment is very advantageous.

More particularly, the nature of medical procedures often requires that an object placed in contact with a patient be sterilized. If a camera or camera mounting system, such as the Dine camera systems, is re-used for various patients, the camera must be reloaded with film, and the camera and the mounting system must be re-sterilized. This requires significant time and labor-intensive procedures. Thus, not only the camera, but also the camera mounting system must be thoroughly cleaned, reloaded with film, repackaged and re-sterilized after each use.

In addition, various medical procedures such as surgery and the time pressures associated therewith require that the camera be easily and quickly mounted onto or removed from a camera mounting apparatus and that the camera mounting apparatus occupy as little space as possible before and after use to accommodate available storage space constraints within an operating room or emergency room and to accommodate hazardous waste disposal requirements within the medical environment. The extensive sterilization procedures required for the maintenance, storage, operation and processing of the Dine camera and mounting apparatus or similar systems severely limits its ease of use and availability. There is a significant possibility that the camera and/or camera mounting apparatus when needed could be unsterile and harbor bacteria or other potentially harmful material such as blood or body fluids containing various blood-borne viruses and/or that proper batteries, film and flash may not be readily available and sterile.

Furthermore, the Dine camera and mounting system were not designed to be used in a sterile environment or to be sterilized or re-sterilized. As seen in the Figures of the Dine patents, the Dine camera and mounting system includes numerous components interconnected by many small connecting members; the surface of the Dine system includes small openings, recessed areas, small spaces between mating or interconnected parts, etc. where potentially harmful material can gather and make it extremely difficult to clean and remove such material completely. Therefore, even if the Dine camera and mounting system were cleaned and sterilized according to known, routine procedures, the Dine camera and system might still contain residues of potentially harmful material on the various surfaces of the Dine camera and mounting system. The Dine camera and system could not survive immersion in ultrasonic cleaning vats or liquid soaking sterilization trays.

In addition, the camera-attaching structure of the Dine camera mounting apparatus requires time consuming and potentially difficult attachment operations such as securing a camera in position and rotating a screw to secure the camera to the camera mounting apparatus as well as securing a second set screw to attach the close-up lens plate to the frame.

Further, the Dine camera mounting apparatus occupies a relatively large space because it cannot be collapsed or reduced in size in any way.

Further, the Dine system requires attention to insure that batteries, flash cubes and fresh film are sterilized and available for use and then requires one or more of a battery check and/or replacement operation, a film loading operation and a flash-cube attachment operation. If the components of the Dine system were cleaned, sterilized and re-sterilized, these processes would likely lead to corrosion of electrical contacts and mechanical breakdown over time which would result in a lack of reliability of the Dine system.

Thus, the inability of prior art camera systems to be cleaned and sterilized easily and completely without damaging the system components, to be used quickly and safely in the operating room or hospital environment, to achieve compact and sterile storage have severely limited the applicability and usefulness of the prior art devices.

SUMMARY OF THE INVENTION

The present invention is an improvement on the invention described and claimed in U.S. Pat. No. 5,950,017, the contents of which are herein incorporated by reference.

To overcome the problems described above, the preferred embodiments of the present invention provide a sterile, disposable camera system which is always ready for use and avoids the need to clean or re-sterilize or reload the camera or clean and re-sterilize the camera mounting system for re-usage and avoids the problems associated with electrical and mechanical failure of components occurring in recycled devices. The camera system of the present invention includes a unique mounting plate which is sterile and disposable while allowing a camera to be quickly and easily mounted on the mounting plate such that the camera quickly obtains in-focus close-up photographs of subjects of interest at predetermined desired distances and fields of view depending on the choice of the dimensions of the structure and corresponding close-up lens incorporated in the mounting plate. The camera system of the invention is extremely easy to use and store and does not require sterilization, maintenance, film loading, flash cubes, batteries or storage after use. The camera is easily, removably mounted on the mounting plate which is constructed to be disposable such that after the camera system has been used, the camera is easily removed from the mounting plate and the mounting apparatus collapsed and discarded as waste. A new, sterile camera mounting system including a camera mounting plate and a pre-loaded disposable film camera can be used for each new patient thereby eliminating the need to sterilize, store and maintain the camera mounting system.

In the case of a need for use of a non-disposable digital still camera or video camera, another preferred embodiment of the present invention can be used. This other preferred embodiment of the present invention includes a prepackaged, sterilized and disposable camera mounting apparatus which is adapted to releasably receive and reliably support a sterile or non-sterile digital still camera or video camera. The disposable frame can be provided in one sterile packaging and the camera can be provided in another sterile packaging, having been re-processed for each procedure. Alternatively, the former can be designed so as to be sterilized and able to accept a drop-in unsterile digital or video camera and then sealed, e.g. with an O-ring and clamp for sterile use.

The sterile camera mounting apparatus is constructed to be capable of being collapsed during storage and easily expanded into a full size when used. After use, the camera mounting apparatus can again be collapsed and discarded as waste to minimize storage space requirements and refuse space occupancy. More particularly, the camera mounting apparatus may preferably be stored in a folded or collapsed arrangement before use to occupy minimal space and then, the camera mounting structure can be unfolded quickly and easily for use. After use, the camera mounting apparatus can again be collapsed and folded to be discarded while occupying minimal space and avoiding the contamination of present and future sterile environments. The camera mounting apparatus package can optionally include a mini-crowbar device for opening the camera body to obtain the film cartridge in a manner that prevents the film cartridge from being contaminated with bodily fluids that might be coating the camera apparatus.

Among the advantages of the camera system of the present invention are that medical personnel are increasingly protected because of the reduced handling requirements of the disposable system with no cleaning, sterilization or major assembly of a camera or camera mounting structures required; second, space and storage requirements are significantly reduced and ease of use is tremendously increased. Third, the cost, work, and time required for cleaning, sterilizing, and overall recycling of the system components are avoided. Fourth, the inevitable deterioration of mechanical parts and corrosion of electrical parts caused by re-cleaning and re-sterilizing are avoided.

These and other elements, features, and advantages of the preferred embodiments of the present invention will be apparent from the following detailed description of the preferred embodiments of the present invention, as illustrated in the accompanying drawings, wherein like reference numerals are used to indicate like elements to avoid repetition.

DETAILED DESCRIPTION OF PREFERRED EMBODIMENTS

A camera system according to the preferred embodiment of the present invention, including the camera and the camera mounting apparatus, can be seen in perspective in FIGS. 1–4, which respectively illustrate the unfolded, top partially folded, top fully folded, and bottom fully folded, views of the camera mounting apparatus of the camera system.

Figure 1:
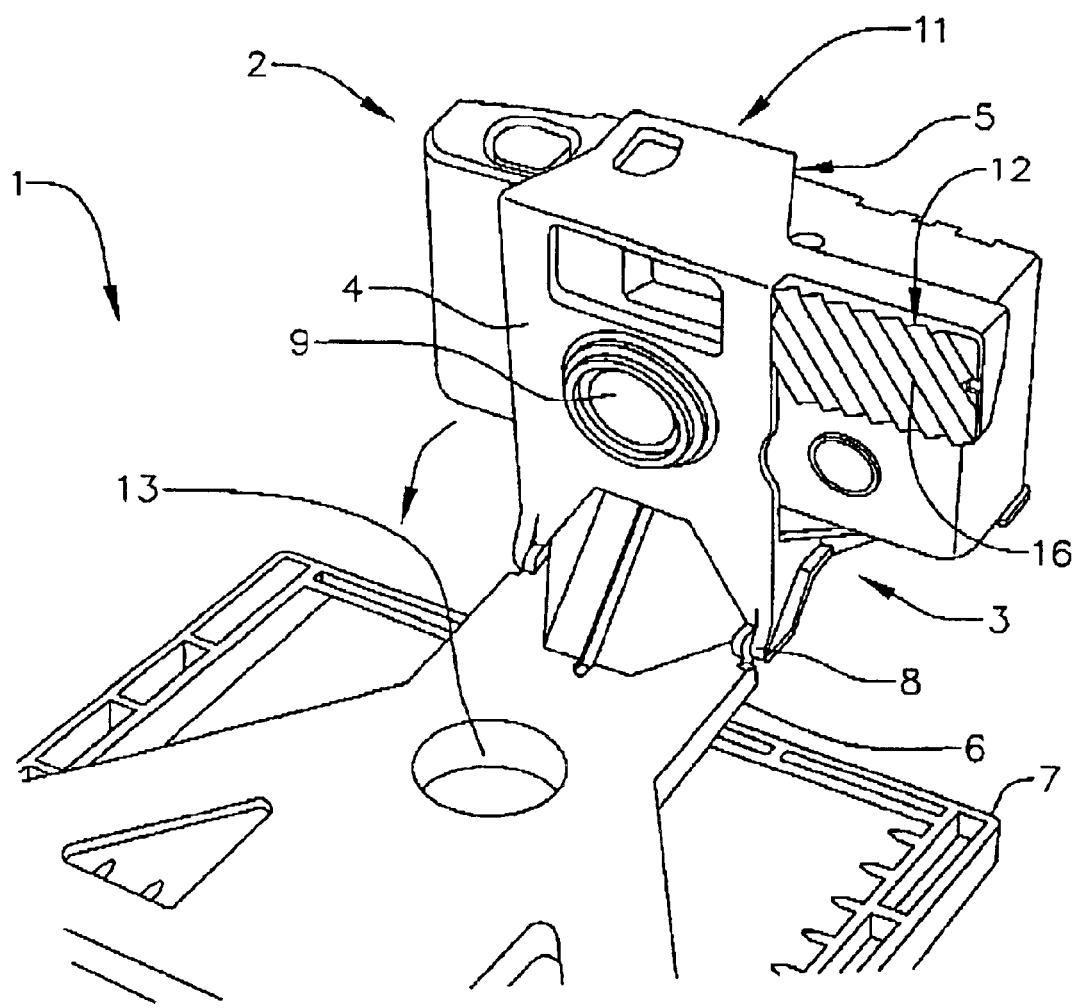
FIG. 1 depicts a top perspective view of the camera mounting apparatus of the present invention in a partially folded position.
Figure 2:
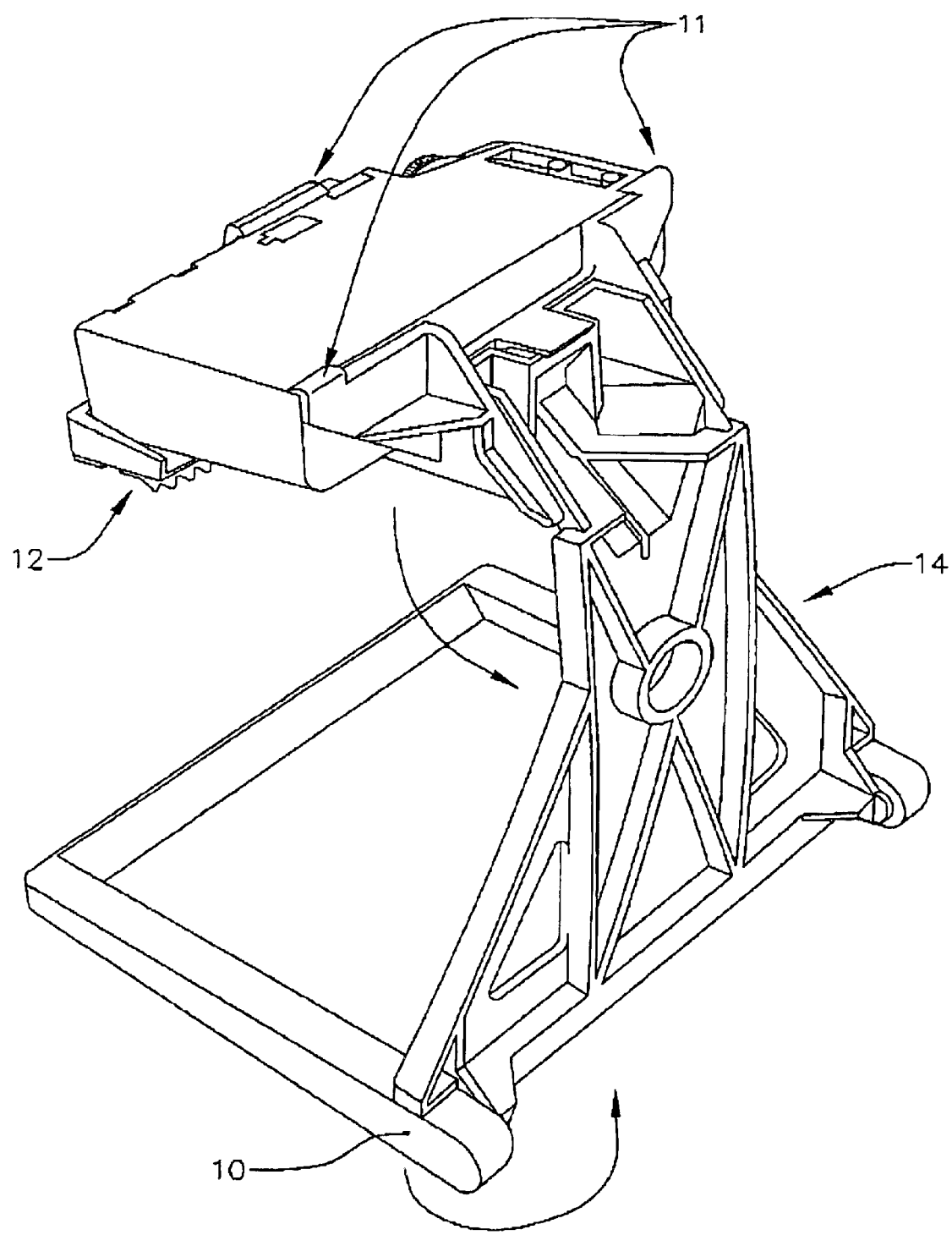
FIG. 2 depicts a side perspective view of the camera mounting apparatus of the present invention in an unfolded position.
Figure 3:
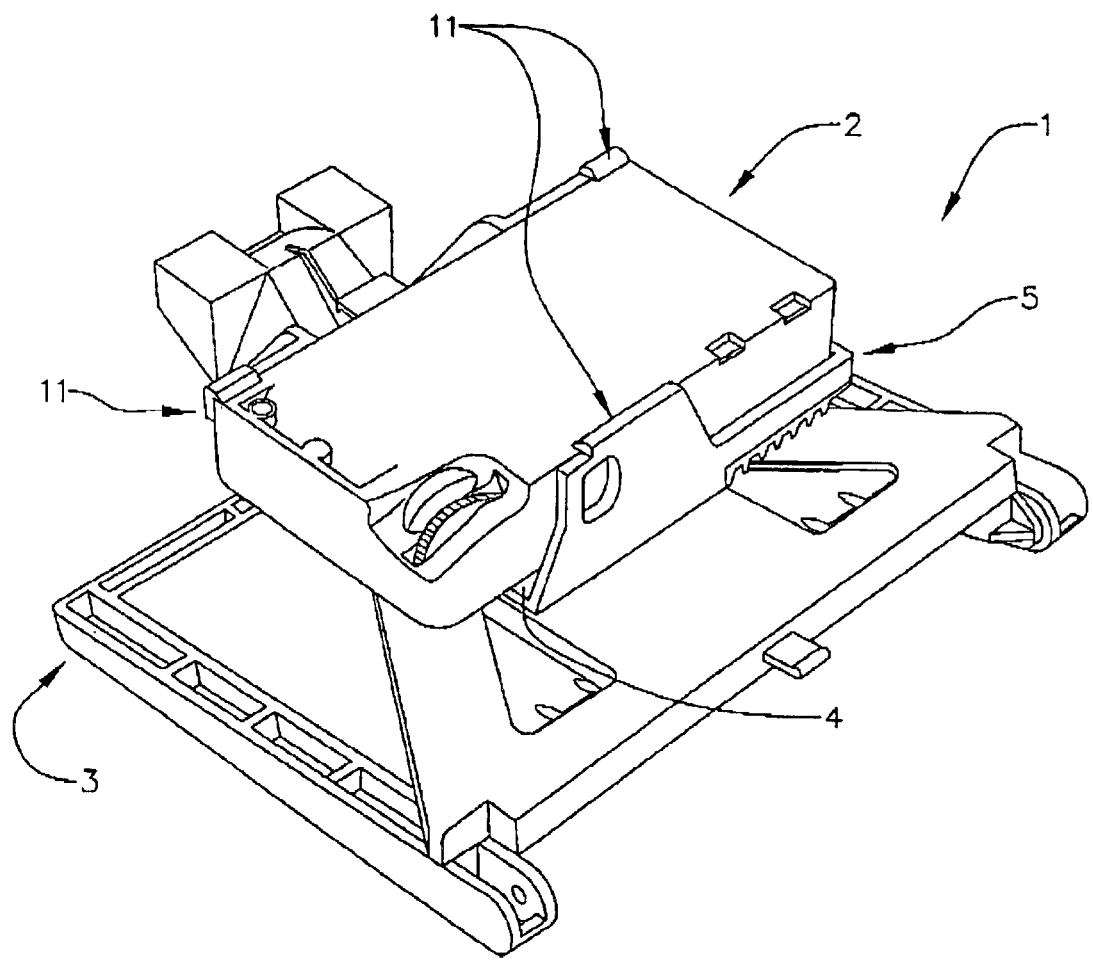
FIG. 3 depicts a top perspective view of the camera mounting apparatus of the present invention in a fully folded position.

Referring now to FIG. 1, the camera mounting system 1 of the present invention includes a camera 2 and camera mounting apparatus 3 which further includes a mounting plate 4 defining a receiving space for receiving the camera 2. The receiving space is defined by at least one mounting member 5 which releasably holds at least a portion of camera 2. Each mounting member 5 can include one or more tabs 11 to hold the camera, as shown in FIGS. 1, 2, and 3. The mounting apparatus 3 also includes a structural member 6 connected to mounting plate 4 by a first hinge 8 so that the mounting plate 4 can rotate about the first hinge 8 in the direction of the arrow into a folded position, as shown in FIG. 3.

The structural member 6 is in turn connected to a base 7 by a second hinge 10, shown in FIG. 2. The structural member 6 and base 7 when combined form frame 14, depicted in FIG. 2. FIG. 1 depicts base 7 in a folded position, with mounting plate 4 in an unfolded position, while FIG. 2 shows the whole mounting apparatus 3 in an unfolded position. Note that base 7 rotates about second hinge 10 in the direction indicated by the arrow in FIG. 2. A top view of the mounting apparatus 3 in a completely folded position is depicted in FIG. 3, showing camera 2 being held by mounting member 5 of mounting plate 4.

Figure 4:
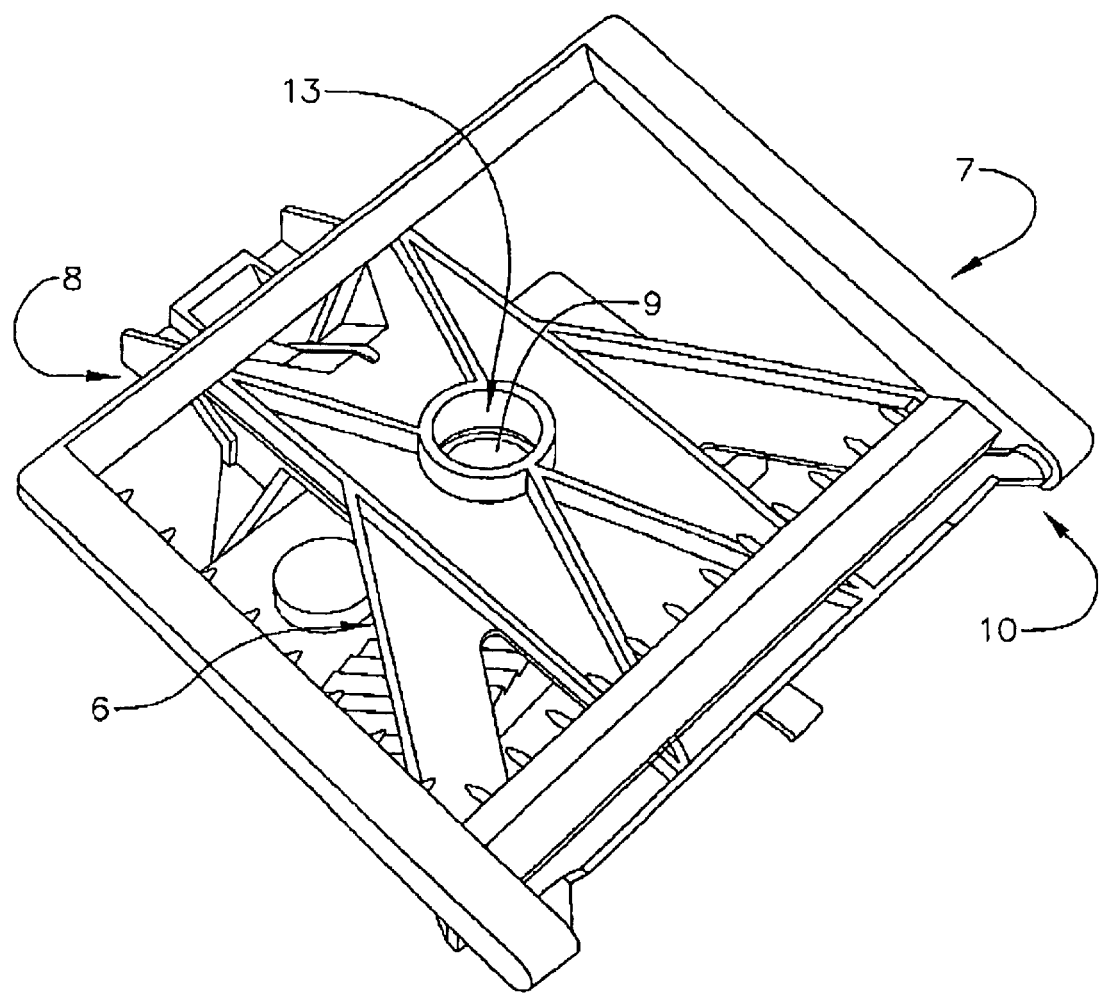
FIG. 4 depicts a bottom perspective view of the camera mounting apparatus of the present invention in a fully folded position.

The mounting plate 4 of the mounting apparatus 3 further includes a close-up lens 9 positioned on the mounting plate 4 at a location corresponding to a location of a lens of the camera 2 when the camera 2 is mounted in the mounting apparatus 3. In order to faciliate a more compact package while folded, the structural member 6 of the mounting apparatus 3 is provided with an opening or recess 13 positioned to receive the close-up lens 9 when the mounting plate 4 is rotated about first hinge 8 into a folded position. FIG. 4 is a bottom view of the mounting apparatus 3 in a folded position, depicting the close-up lens 9 in the opening or recess 13.

In addition, the mounting plate 4 can include an angled flash cover 12, shown in FIGS. 1 and 2, for diffusing and directing the light emitted by a built-in flash unit on camera 2. The angled slats 16 of the flash cover correct for the parallax error caused by the fact that the flash is not aligned on the central axis of the camera lens, so as to insure a correct, even exposure on the image plane. The diffuser of the flash cover 12 also insures even illumination across the image plane, avoiding hot spots secondary to the built-in flash. The flash itself generates sufficient illumination so that the photographer need not be concerned about the effects of room lighting. Thus, properly exposed photographs can be obtained regardless of whether room lights are on or off.

The dimensions of the structural support member 5 joining the base 7 to the mounting plate 4 are preferably selected so that the base 7 lies at a distance equal to the point of focus of the combined close-up lens 9 and the camera lens. The dimensions of the base 7 are such that the interior of the base 7 borders the image field of the film in the camera. In this manner, the sterile camera unit can be easily releasably secured to the mounting plate 4, the base 7 can be placed on or over the subject to be photographed and the film in the camera 2 exposed to provide in-focus close-up photographic images of the subject accurately framed by the base.

An additional problem addressed by the system of the invention is that the film cartridge contained by the camera must, according to OSHA regulations, be delivered to a film processor uncontaminated by any body fluids that might have contacted the camera and/or the mounting apparatus during the photography session. To this end, the camera mounting system of the invention can include a sterile mini-crowbar-like tool that is packaged with the sterile camera mounting system. After the photography session, the film is advanced completely into its receiving film cartridge and the camera, potentially contaminated with tissue or body fluids, yet still sterile, is split open using the mini-crowbar like tool provided in the sterile package, allowing the uncontaminated film cartridge to drop onto a clean surface outside the surgical field. The film can then be handled safely by any staff person and sent for film processing.

The camera mounting system of the present invention is preferably manufactured from a lightweight plastic material or other suitable lightweight material that is easy to store before use and is easily disposed after use and complies with OHSA hazardous waste management requirements.

According to a preferred embodiment of the present invention, the camera and frame are preferably sterilized and then provided in a double-wrap sterile packaging which maintains the sterile environment of the camera mounting apparatus. More particularly, the camera and the frame are provided in a container, such as a box. The box is preferably wrapped in a material such as paper or other suitable material that is gas permeable. Then, the wrapped container having the camera and frame disposed therein are sterilized via an autoclave or similar device using ethylene oxide or other suitable method. A second wrap is provided on the outside of the wrapped container before it is sterilized to form the sterilized packaging materials. The entire apparatus is preferably stored and shipped in this sterile packaging. To achieve the desired sterility, the camera mounting apparatus 1 is preferably sealed in sterile packaging as shown and described in U.S. Pat. No. 5,950,017, to achieve a sterile package and enhance its desirability for medical use.

In an alternative embodiment where a camera other than a disposable camera is used, the frame can be provided in one sterile packaging and the camera can be provided in another sterile packaging.

In another alternative embodiment, an unsterile digital or video camera can be dropped into the receiving space of the frame and sealed with an O-ring and clamp to form a sealed, sterile unit. The frame and case can be designed to allow operation of the camera controls, as is done for example, with an underwater camera case.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for mounting a camera over a subject to be photographed, the camera containing a camera lens, said apparatus comprising:

a mounting plate which is sterile and adapted to receive the camera, said mounting place having a shape defining a receiving space which releasably holds at least a portion of the camera when said mounting plate receives the camera, said mounting plate having close-up lens which protrudes from the mounting plate and that aligns and receives the lens of the camera when the camera is received by said mounting plate;

a frame which is sterile and supports said mounting plate, said frame including a base and a unitary structural member, said unitary structural member being coupled to said mounting plate with a first hinge and to said base with a second hinge such that said mounting plate, base and unitary structural member are foldable from a collapsed position to a non-collapsed position, the unitary structural member having a recess or opening positioned therein aligned to receive the protruding close-up lens;

a container holding the sterile mounting plate, the frame and the camera;

a first sterile wrap material covering said container holding the mounting plate, the frame and the camera;

a second sterile wrap material covering said first sterile wrap material covering said container.

2. The apparatus of claim 1, wherein said mounting plate includes at least one mounting member shaped to define said receiving space which releasably holds at least said portion of the camera when the camera is received by said mounting plate.

3. The apparatus of claim 1, is positionable from said close-up lens of said mounting plate at a distance which is equal to the point of focus of the camera lens acting in combination with said close-up lens.

4. The apparatus of claim 3, wherein said unitary structural member includes an opening or recess positioned to receive said close-up lens of said mounting plate when the frame is in a collapsed position.

5. The apparatus of claim 3, wherein said base of said frame defines an image area at said point of focus of the camera lens acting in combination with said close-up lens.

6. The apparatus of claim 5, wherein said image area defined by said base is a planar image area which coincides with the image field of the camera lens in the camera.

7. The apparatus of claim 1, further including packaging material which encloses said apparatus.

8. The apparatus of claim 7, wherein said packaging material is sterile packaging material which encloses the apparatus in a sterile environment.

9. The apparatus of claim 1, wherein the camera includes a flash unit, and wherein the mounting plate further comprises a flash cover that is adapted to diffuse and direct the light emitted from said flash unit.

10. The apparatus of claim 9, wherein the flash cover further comprises angled slats for directing the emitted light to correct for parallax error to insure even illumination, and a diffuser for diffusing said emitted light to insure a proper exposure.

11. The apparatus of claim 1, further comprising a mini-crowbar-like tool for opening the camera, wherein said mini-crowbar-like tool is includable in the container that holds the sterile mounting plate, the frame, and the camera.

12. A camera system for taking close-up photographs of subjects which are automatically in focus, said camera system comprising:
    a camera being sterile and including a camera body and a camera lens disposed in said camera body;
    a camera mounting apparatus being sterile and including a mounting plate adapted to receive said camera, said mounting plate having a shape defining a receiving space which releasably holds at least a portion of said camera body when said mounting plate receives said camera, said mounting plate having close-up lens which protrudes from the mounting plate and that aligns and receives the lens of the camera when the camera is received by said mounting plate;
    said camera mounting apparatus also including a frame which supports said mounting plate, wherein said frame includes a unitary structural member located between a base and said mounting plate and is connected to said base with a first hinge and to said mounting plate with a second hinge such that said frame is foldable from a collapsed position to a non-collapsed position, the unitary structural member having a recess or opening positioned therein aligned to receive the protruding close-up lens;
    a container holding the camera, the mounting plate, and the frame;
    a first sterile wrap material covering said container holding the mounting plate, the frame, and the camera; and
    a second sterile wrap material covering said second sterile wrap material covering said container.

13. A camera system as set forth in claim 12, wherein said mounting plate of said camera mounting apparatus includes at least one mounting member shaped to define said receiving space which releasably holds at least said portion of said camera body when said camera is received by said mounting plate.

14. A camera system as set forth in claim 12, wherein said base of said frame defines an image area at a point of focus of said camera lens acting in combination with said close-up lens.

15. A camera system as set forth in claim 14, wherein said image area defined by said base is a planar image area which coincides with the image field of said camera lens in said camera.

16. A camera system as set forth in claim 12, wherein said base can be positioned from said close-up lens of said mounting plate at a distance which is equal to the point of focus of the cameral lens acting in combination with said close-up lens.

17. The apparatus of claim 12, wherein the camera includes a flash unit, and wherein the mounting plate further comprises a flash cover that can diffuse and direct the light emitted from said flash unit.

18. The apparatus of claim 17, wherein the flash cover further comprises angled slats for directing the emitted light to correct for parallax error to insure even illumination, and a diffuser for diffusing said emitted light to insure a proper exposure.

19. The apparatus of claim 12, further comprising a mini-crowbar for opening the camera, wherein said mini-crowbar is includable in the container that holds the sterile mounting plate, the frame and the camera.

20. An apparatus for mounting a camera over a subject to be photographed, the camera containing a camera lens, said apparatus comprising:
    a mounting plate adapted to receive the camera, said mounting plate having a shape defining a receiving a space which releasably holds at least a portion of the camera when said mounting plate receives the camera, said mounting plate having close-up lens which protrudes from the mounting plate and that aligns and receives the lens of the camera when the camera is received by said mounting plate;
    a frame which supports said mounting plate, said frame including a base and a unitary structural member, said unitary structural member coupled to said mounting plate with a first hinge and to said base with a second hinge such that said mounting plate, base and unitary structural member can fold from a collapsed position to a non-collapsed position, the unitary structural member having a recess or opening positioned therein aligned to receive the protruding close-up lens.

21. The apparatus of claim 20, wherein said mounting plate includes at leant one mounting member shaped to define said receiving apace which releasably holds at least said portion of the camera when the camera is received by said mounting plate.

22. The apparatus of claim 20, wherein said base can be positioned from said close-up lens of said mounting plate at a distance which is equal to the point of focus of the camera lens acting in combination with the close-up lens.

23. The apparatus of claim 22, wherein said base of said frame defines an image area at said point of focus of the camera lens acting in combination with said close-up lens.

24. The apparatus of claim 23, wherein said image area defined by said base is a planar image area which coincides with the image field of the camera lens in the camera.

25. The apparatus of claim 20, wherein the camera includes a flash unit, and wherein the mounting plate further comprises a flash cover that can diffuse and direct the light; emitted from said flash unit.

26. The apparatus of claim 25, wherein the flash cover further comprises angled slats for directing the emitted light to correct for parallax error to insure even illumination, and a diffuser for diffusing said emitted light to insure a proper exposure.

27. A camera system for taking close-up photographs of subjects which are automatically in focus, said camera system comprising:
    a camera including a camera body, a camera lens disposed in said camera body, and a flash unit;
    a camera mounting apparatus including a mounting plate adapted to receive said camera, said mounting plate having a shape defining a receiving space which releasably holds at least a portion of said camera body when said mounting plate receives said camera, said mounting plate including a flash cover that diffuses and directs the light emitted from said flash unit, the flash cover comprising angled slats for directing the emitted light to correct for parallax error and to insure proper even illumination, and a diffuser for diffusing said emitted light to insure a proper exposure; and said camera mounting apparatus also including a frame which supports said mounting plate, wherein said frame includes a structural member located between a base and said mounting plate and is connected to said base with a first hinge and to said mounting plate with a second hinge such that said flame can fold from a collapsed position to a non-collapsed position.

28. A camera system as set forth in claim 27, wherein said mounting plate of said camera mounting apparatus includes at least one mounting member shaped to define said receiving space which releasably holds at least said portion of said camera body when said camera is received by said mounting plate.

29. A camera system as set forth in claim 27, wherein said base of said frame defines an image area at said point of focus of said camera lens acting in combination with said close-up lens.

30. A camera system as set forth in claim 29, wherein said image area defined by said base is a planar image area which coincides with the image field of said camera lens in said camera.

31. A camera system as set forth in claim 27, wherein said mounting plate includes a close-up lens which aligns with the lens of the camera when the camera is received by the mounting plate, and wherein said base can be positioned from said close-up lens of said mounting plate at a distance which is equal to the point of focus of the camera lens acting in combination with the close-up lens.

32. A camera system as set forth in claim 31, wherein said structural member is a unitary structure that includes an opening or recess positioned to receive said close-up lens of said mounting plate when the flame is in a collapsed position.

* * * * *